(12) United States Patent
Sutter

(10) Patent No.: US 12,217,599 B2
(45) Date of Patent: Feb. 4, 2025

(54) EMERGENCY LIGHTING ELEMENT

(71) Applicant: LUFTHANSA TECHNIK AG, Hamburg (DE)

(72) Inventor: Wolfgang Sutter, Halstenbek (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 18/563,395

(22) PCT Filed: May 20, 2022

(86) PCT No.: PCT/EP2022/063748
§ 371 (c)(1),
(2) Date: Nov. 22, 2023

(87) PCT Pub. No.: WO2022/248358
PCT Pub. Date: Dec. 1, 2022

(65) Prior Publication Data
US 2024/0221478 A1 Jul. 4, 2024

(30) Foreign Application Priority Data
May 26, 2021 (DE) ..................... 10 2021 113 490.0

(51) Int. Cl.
*G08B 7/06* (2006.01)
*B60Q 3/46* (2017.01)
(Continued)

(52) U.S. Cl.
CPC .............. *G08B 7/066* (2013.01); *B60Q 3/46* (2017.02); *F21K 9/64* (2016.08); *F21K 9/68* (2016.08);
(Continued)

(58) Field of Classification Search
CPC .. G08B 7/066; B60Q 3/46; F21K 9/64; F21K 9/68; F21V 9/32; F21V 13/08;
(Continued)

(56) References Cited

U.S. PATENT DOCUMENTS 4,420,898 A 12/1983 Moses
5,424,006 A * 6/1995 Murayama ......... C09K 11/7734
252/301.4 R
(Continued)

FOREIGN PATENT DOCUMENTS

CN 206944046 U 1/2018
DE 19908404 A1 9/2000
(Continued)

*Primary Examiner* — Elmito Breval
(74) *Attorney, Agent, or Firm* — LEYDIG, VOIT & MAYER, LTD.

(57) ABSTRACT

An emergency lighting element includes a planar, electrically operable radiation source for planar emission of electromagnetic radiation at a front side of the radiation source; and a long-afterglow layer over a whole area on the front side of the radiation source. A penetration depth into the long-afterglow layer for radiation emitted by the radiation source corresponds at least to a thickness of the long-afterglow layer. The long-afterglow layer comprises phosphorescent material, an absorption spectrum of the long-afterglow layer at least partly overlaps an emission spectrum of the radiation source and an emission spectrum of the long-afterglow layer lies substantially in a visible range.

15 Claims, 5 Drawing Sheets

(51) Int. Cl.
*F21K 9/64* (2016.01)
*F21K 9/68* (2016.01)
*F21V 9/32* (2018.01)
*F21V 13/08* (2006.01)
*F21V 23/00* (2015.01)
*F21V 23/02* (2006.01)
*F21V 31/00* (2006.01)
*B64D 45/00* (2006.01)
*F21W 106/00* (2018.01)
*F21W 107/30* (2018.01)
*F21Y 105/16* (2016.01)
*F21Y 115/10* (2016.01)
*H02J 50/00* (2016.01)

(52) U.S. Cl.
CPC .............. *F21V 9/32* (2018.02); *F21V 13/08* (2013.01); *F21V 23/005* (2013.01); *F21V 23/023* (2013.01); *F21V 31/00* (2013.01); *B64D 45/00* (2013.01); *B64D 2045/007* (2013.01); *F21W 2106/00* (2018.01); *F21W 2107/30* (2018.01); *F21Y 2105/16* (2016.08); *F21Y 2115/10* (2016.08); *G08B 7/062* (2013.01); *H02J 50/005* (2020.01)

(58) Field of Classification Search
CPC ...... F21V 23/005; F21V 23/023; F21V 31/00; B64D 45/00; B64D 2045/007; F21W 2106/00

See application file for complete search history.

(56) References Cited

U.S. PATENT DOCUMENTS

| | | |
|---|---|---|
| 6,068,383 A | 5/2000 | Robertson et al. |
| 6,364,498 B1 | 4/2002 | Burbank |
| 2005/0198879 A1 | 9/2005 | Hannington |
| 2012/0304512 A1 | 12/2012 | Martin et al. |
| 2013/0291413 A1 | 11/2013 | Lifka et al. |
| 2018/0320069 A1 | 11/2018 | O'Kell et al. |

FOREIGN PATENT DOCUMENTS

| | | |
|---|---|---|
| DE | 19948592 A1 | 4/2001 |
| DE | 29624636 U1 | 12/2005 |
| DE | 102007046650 A1 | 4/2009 |
| DE | 102014005062 A1 | 4/2015 |
| DE | 202015105197 U1 | 10/2015 |

\* cited by examiner

EMERGENCY LIGHTING ELEMENT

CROSS REFERENCE TO RELATED APPLICATIONS

This application is a U.S. National Phase application under 35 U.S.C. § 371 of International Application No. PCT/EP2022/063748, filed on May 20, 2022, and claims benefit to German Patent Application No. DE 10 2021 113 490.0, filed on May 26, 2021. The International Application was published in German on Dec. 1, 2022 as WO 2022/248358 A1 under PCT Article 21(2).

FIELD

The present disclosure relates to an emergency lighting element, in particular for use as an escape route marking in commercial aircraft.

BACKGROUND

In commercial aircraft, there are, in principle, two variants for mandatorily prescribed emergency lighting elements for showing passengers the way to the emergency exits in case of emergency in darkness and when the general cabin lighting has failed. Besides emergency exit signs that light up in the dark, strip-shaped escape route markings arranged close to the floor are also known, which can be followed in order to get to the closest emergency exit.

Known electrical systems for emergency lighting elements comprise luminous units having one or more illuminants, such as incandescent bulbs or LEDs, which are arranged in a housing for protection against external influences and which can be linked by electrical cabling to the onboard electrical network of the aircraft and can be operated by way of that. In addition, at least in the case of luminous units fitted near the floor, buffer batteries have to be provided as well, which can ensure operation of the luminous units even in the event of failure of the onboard electrical network. Corresponding systems regularly have a considerable mass in particular owing to the buffer batteries required.

There are also photoluminescent systems in which the escape route marking has photoluminescent surfaces, which are charged by the ambient or cabin light during normal operation and persistently glow in darkness—and in particular in case of emergency—even over a relatively long period of time and thus indicate the emergency exits and escape routes.

For the phosphorescent systems, it has been necessary to ensure in this case that the phosphorescent surfaces are charged by the cabin lighting to a sufficient extent during normal operation in order thus to be able to ensure the required afterglow in darkness.

The present inventors have recognized, however, that this is precisely what is no longer always guaranteed, owing to the LED technology that is increasingly being used for the cabin lighting. Even if LED lighting systems offer operators a high degree of variability for the lighting of an aircraft cabin, e.g. with regard to the color of the light, in conjunction with low energy consumption, it is not consequently ensured that enough light in the spectral range relevant to the charging of the phosphorescent systems will be made available at least in the flight phases that are relevant in terms of safety.

SUMMARY

In an embodiment, the present disclosure provides an emergency lighting element that includes a planar, electrically operable radiation source for planar emission of electromagnetic radiation at a front side of the radiation source; and a long-afterglow layer over a whole area on the front side of the radiation source. A penetration depth into the long-afterglow layer for radiation emitted by the radiation source corresponds at least to a thickness of the long-afterglow layer. The long-afterglow layer comprises phosphorescent material, an absorption spectrum of the long-afterglow layer at least partly overlaps an emission spectrum of the radiation source and an emission spectrum of the long-afterglow layer lies substantially in a visible range.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
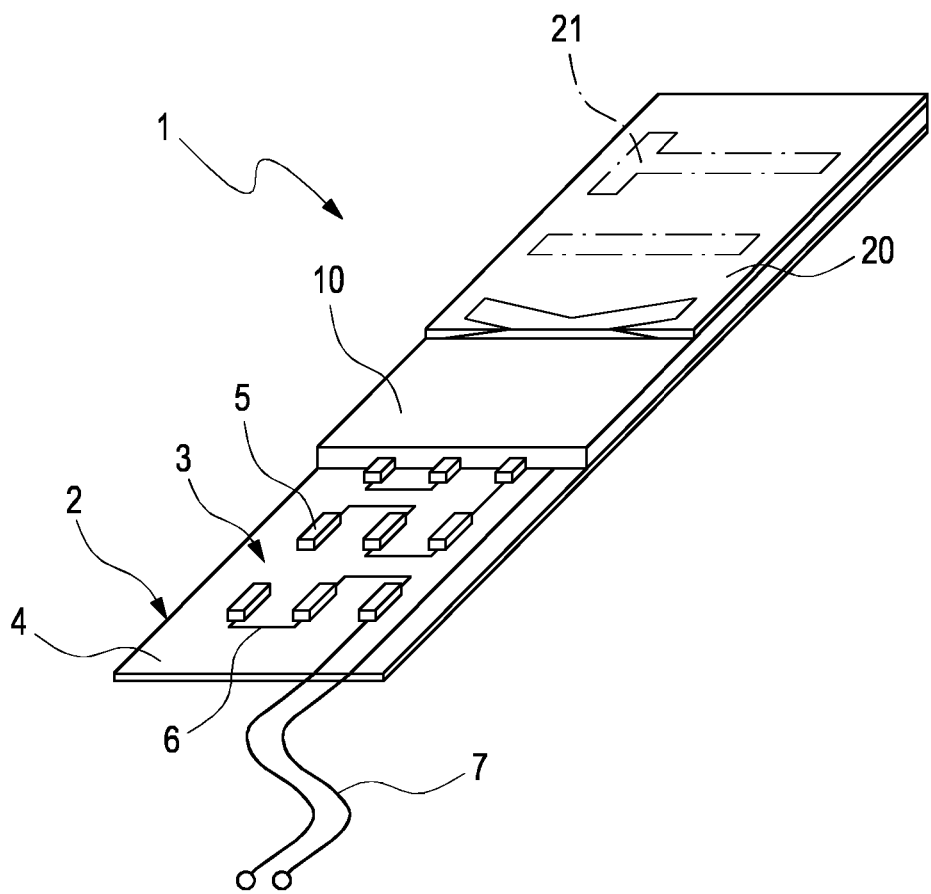
FIG. 1 shows a first exemplary embodiment of an emergency lighting element according to the present disclosure.

The present disclosure is directed to providing an emergency lighting element in which the disadvantages from the prior art no longer occur, or occur only to a reduced extent.

Accordingly, the present disclosure relates to an emergency lighting element, in particular for a commercial aircraft, comprising a planar, electrically operable radiation source for the planar emission of electromagnetic radiation at the front side of the radiation source, wherein a long-afterglow layer is provided over the whole area on the front side of the radiation source, wherein the penetration depth into the long-afterglow layer for the radiation emitted by the radiation source corresponds at least to the thickness of the long-afterglow layer, and the long-afterglow layer comprises phosphorescent material, the absorption spectrum of which at least partly overlaps the emission spectrum of the radiation source and the emission spectrum of which lies substantially in the visible range.

Firstly some terms used in connection with the present disclosure will be explained.

A layer or a material is deemed to be "long-afterglow" if, after excitation by radiation in the UV or visible range, it can persistently glow for a duration of from at least a few seconds to several hours without the excitation being maintained. This effect is also known to a person skilled in the art as phosphorescence, and likewise known is the differentiation between the latter and fluorescence, in which the afterglow decays practically immediately after the excitation has ended.

An element is deemed to be "planar" if the characteristic dimensions of a surface of the element are in each case at least one order of magnitude (power of ten) larger than the characteristic dimension of the element perpendicular to this surface. The characteristic dimensions are e.g. the length and/or width in the case of a rectangular surface, and the diameter in the case of a circular surface. In the case of an elongated element, the length thereof forms the characteristic dimension. The dimension perpendicular to the surface in question is commonly also referred to as the "thickness" of the element.

In association with the present disclosure, "penetration depth" denotes the point at which an electromagnetic wave, upon penetrating into a medium, corresponds to just over 0% of the initial amplitude. If the penetration depth is equal to the extent of the medium in the direction thereof, all of the radiation remains in the medium. If the penetration depth is greater than the extent of the medium in the direction thereof, transmission through the medium is attained.

An absorption spectrum at least partly overlaps an emission spectrum if part of the emission in accordance with the emission spectrum falls into the absorption spectrum and is thus absorbed. In this case, the degree of overlap can be chosen by a person skilled in the art in a suitable manner for the desired functionality. By virtue of the absorption of radiation, the long-afterglow layer is ultimately "charged" and can re-emit the energy thus absorbed as emission with a time delay, in which case the absorption spectrum and the emission spectrum of the persistently glowing layer fundamentally differ from one another.

The present disclosure has recognized that a combination of an electrically operable radiation source for the planar emission of electromagnetic radiation, such as are also known in principle from known electrical systems for emergency lighting or escape route markings, with a persistently glowing layer, comparable to the phosphorescent surface of phosphorescent systems, affords advantages which cannot be realized in the systems known from the prior art on their own.

In this regard, it is possible on account of the persistently glowing layer of the emergency lighting element according to the present disclosure, which layer is charged by the electrically operable radiation source on account of the overlap according to the present disclosure between absorption spectrum and emission spectrum, that even in the event of possible failure of the energy supply, the emergency lighting element can still persistently glow in the visible range, without this necessitating a buffer battery for continued operation of the radiation source itself. By virtue of the possible omission of the buffer battery, the emergency lighting element according to the present disclosure can be made more lightweight than a comparable electrical system for emergency lighting in accordance with the prior art.

At the same time, the combination according to the present disclosure of electrically operable radiation source and long-afterglow layer can ensure that enough radiation is fed to the long-afterglow layer in the absorption spectrum thereof in order thus to be able to charge the long-afterglow layer to a sufficient extent independently of the illumination scenario in the surroundings. In particular, the emergency lighting element according to the present disclosure can thus be charged independently of the rest of the cabin lighting, with the result that the latter can be designed freely and in particular without regard for the charging of emergency elements.

In order to enable the long-afterglow layer to be charged by the radiation source to a sufficient extent, the charging being effected proceeding from the rear side of the persistently glowing layer, with the rear side coinciding with the front side of the radiation source, while the emission ultimately desired from the persistently glowing layer is intended to be effected at the front side thereof, provision is made for the penetration depth into the long-afterglow layer for the radiation emanating from the radiation source to correspond at least to the thickness of the long-afterglow layer. This ensures that the regions of the long-afterglow layer directly at the front side thereof are also charged by the radiation source to a sufficient extent, which is a considerable advantage for the light emission of the persistently glowing layer. At the same time, by virtue of the corresponding predefinition of the penetration depth, electromagnetic radiation from the surroundings can also penetrate deep into the persistently glowing layer and charge the regions near the radiation source, even if the latter is not operated at times.

In order that the regions of the persistently glowing layer directly at the front side thereof can be charged well by the radiation source, it is preferred if the penetration depth for the radiation emanating from the radiation source is chosen to be greater than the thickness of the long-afterglow layer such that the transmission through the persistently glowing layer is greater than 0%. Preferably, the transmission is between 5% and 50%, with further preference between 8% and 25%. Given corresponding transmission, the electromagnetic radiation from the radiation source that penetrates as far as the front side of the persistently glowing layer is increased, such that rapid charging of the long-afterglow layer can be attained in this region, too.

In order to attain a corresponding penetration depth, in one preferred embodiment, the long-afterglow layer can comprise a transparent or translucent matrix with phosphorescent pigments embedded therein. Suitable choice of the number and configuration of the pigments and also the configuration of the matrix can have a good influence on the penetration depth of radiation into the persistently glowing layer and thus ultimately also on the transmission of the persistently glowing layer. The transparent or translucent matrix can be composed of a polymer (e.g. polycarbonate, an acrylate, epoxy, silicone) or glass. The phosphorescent pigments are preferably based on zinc sulfide or strontium aluminate.

The long-afterglow layer serves for emitting visible light inter alia if the radiation source is switched off or fails. In this case, it is preferred if the long-afterglow layer is designed in such a way that after complete charging and subsequent darkness for 10 minutes, it emits a luminance of at least 0.03 mcd/m$^2$, preferably of at least 0.1 mcd/m$^2$, more preferably of at least 0.3 mcd/m$^2$. Corresponding light emissions are regularly deemed to be sufficient e.g. for escape route markings in aircraft in the case of an evacuation.

It is preferred if the radiation source is designed for emitting electromagnetic radiation in the visible range and the long-afterglow layer is designed for partly transmitting the radiation of the radiation source. In this case, the emission of the radiation source and the transmission of the long-afterglow layer can preferably be coordinated with one another such that the emission of electromagnetic radiation in the visible range by the emergency lighting element is at least 50% higher when the radiation source is switched on compared with when the radiation source is switched off. In this case, the emission of electromagnetic radiation or the emitted electromagnetic radiation corresponds to the luminance, which is usually indicated in cd/m$^2$ or mcd/m$^2$. With the radiation source switched on, the emergency lighting element can then emit light more brightly than minimum light emission stipulated by possible minimum requirements, whereby safety can be fundamentally increased. If the radiation source fails in an emergency situation, the minimum requirements can still be satisfied, however, by the long-afterglow layer at least for a certain period of time.

As an alternative thereto, the radiation source can be designed for emitting electromagnetic radiation in the UV range—and thus in the non-visible range. In this case, the emission of the visible light by the emergency lighting element is effected solely by the long-afterglow layer, which remains permanently charged when the radiation source is switched on. An advantage of this embodiment is the initially constant luminosity of the emergency lighting element in the event of failure of the radiation source e.g. owing to an emergency situation. Particularly if the long-afterglow layer is charged in the UV-C range, it is preferred if a UV filter tuned to the radiation of the radiation source is preferably arranged on the side of the long-afterglow layer facing away from the radiation source—i.e. on the front side of the long-afterglow layer.

It is preferred if the radiation source is designed as a reflection layer for radiation impinging thereon at least in the visible range. The configuration as a reflection layer can improve both the charging of the long-afterglow layer and the light emission by the persistently glowing layer, since the radiation that otherwise impinges ineffectively on the radiation source is reflected back again in the direction of the front side of the long-afterglow layer. Gains in the efficiency of the long-afterglow layer of up to 15% can be achieved in this way. The reflection property can be achieved by way of a bright, preferably white, coloration or a specularly reflective surface of the radiation source. A bright coloration can be obtained through the use of reflective pigments, such as titanium oxide, for example. Reflective coatings are also possible for example by way of chromium vapor deposition or by way of chemical or electrolytic coating with a reflective material.

The planar radiation source can be designed as a planar arrangement of a multiplicity of light-emitting diodes. In this case, the light-emitting diodes can be printed directly onto a carrier material, onto which the conductor tracks for supplying the light-emitting diodes with electrical power are preferably printed as well. As an alternative thereto, the planar radiation source can be an electroluminescent film.

It is preferred if the thickness of the planar radiation source is less than 2.5 mm, preferably less than 1.5 mm, more preferably less than 0.75 mm, particularly preferably less than 0.5 mm. Radiation sources of correspondingly flat configuration enable a small total thickness of the emergency lighting element.

It is preferred if the thickness of the long-afterglow layer is at least 0.4 mm, preferably at least 0.7 mm, more preferably at least 1.2 mm. It has been found that corresponding thicknesses give rise to an advantageous configuration of the long-afterglow layer.

The emergency lighting element preferably comprises a cable link and/or a coupling coil for wireless energy transmission for supplying the radiation source with electrical energy. If the radiation source is not directly controlled by way of the circuit of the energy feed, the emergency lighting element can also comprise a control circuit that can change the switch-on state of the radiation source, e.g. on the basis of an external control signal. The control circuit can be printed onto a carrier material, e.g. of the planar radiation source.

It is preferred if for protection against external influences on the side of the long-afterglow layer facing away from the radiation source, or that is to say the front side of the layer, a transparent or translucent protective layer is provided and/or radiation source and long-afterglow layer are/is arranged in a housing, which is transparent or translucent at least in the region of the long-afterglow layer. Corresponding housings or protective layers can protect the radiation source and the long-afterglow layer against mechanical influences and/or moisture, whereby the lifetime of the emergency lighting element can regularly be prolonged.

It is particularly preferred if the emergency lighting element is designed as an escape route marking, preferably as a strip-shaped escape route marking for laying on the floor of an aircraft cabin. Comparable escape route markings of other designs, and also their use for marking escape routes, in particular on board aircraft, are known.

FIG. 1 schematically illustrates a first exemplary embodiment of an emergency lighting element 1 according to the present disclosure, individual elements or layers only being partly shown in the illustration in order to allow a view of the underlying elements or layers. In principle, however, the individual layers each extend over the whole area of the respective underlying layers.

The emergency lighting element 1 comprises a planar radiation source 2 comprising a carrier material 4, which is configured to reflect visible light on the front side 3 of the radiation source 2 and on which a multiplicity of light-emitting diodes 5 in a planar arrangement and also conductor tracks 6 for supplying the diodes with energy are printed, such that the radiation source 2 emits electromagnetic radiation—in this case light in the visible range—in a planar fashion at its front side. The conductor tracks 6 are led as far as the edge of the carrier material 4 and are connected to a cable link 7 for supplying the radiation source 2 with electrical energy. The thickness of the radiation source 2 is 0.75 mm in this exemplary embodiment.

Figure 3:
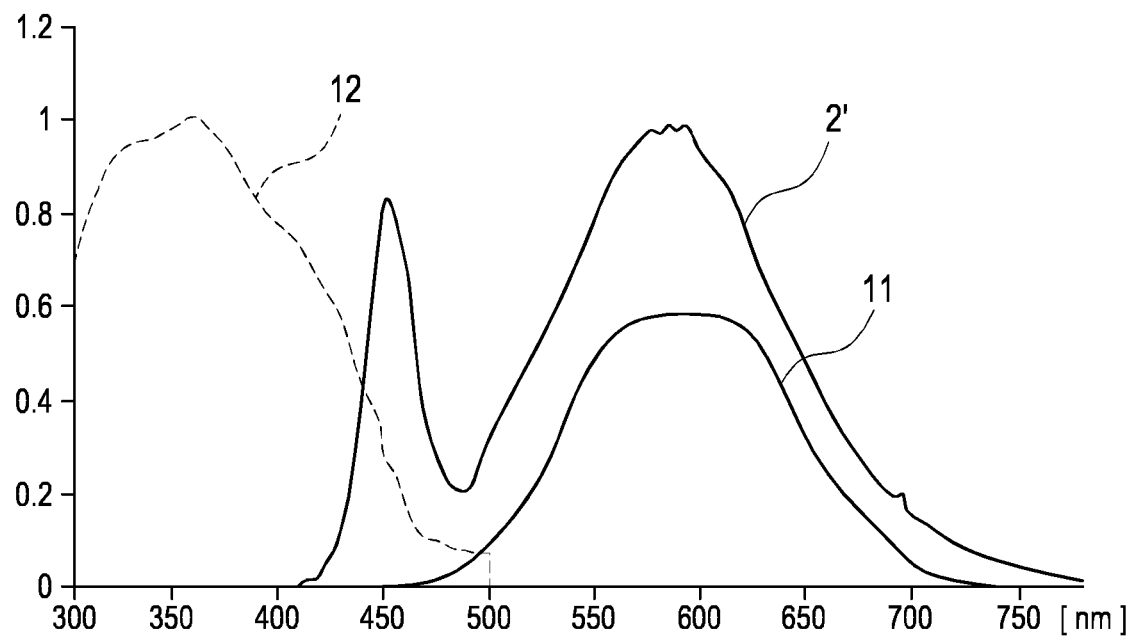
FIG. 3 shows a schematic illustration of the emission and absorption spectra of radiation source and long-afterglow layer from FIGS. 1 and 2.

A long-afterglow layer 10 having a thickness of 1.2 mm is provided over the whole area on the front side 3 of the radiation source 2, in which layer long-afterglow pigments on the basis of zinc sulfide are embedded in a transparent matrix composed of polycarbonate. As can be discerned in FIG. 3, the emission spectrum 11 of the long-afterglow pigments and thus of the long-afterglow layer 10 lies in the visible range. The absorption spectrum 12 of the long-afterglow layer 10 overlaps the emission spectrum 2' of the radiation source 2, such that the long-afterglow layer 10 is charged during operation of the radiation source 2.

Through suitable choice of the number of pigments and the arrangement thereof in the matrix, the long-afterglow layer 10 is designed such that the penetration depth into the long-afterglow layer 10 for the radiation emanating from the radiation source 2 is greater than the thickness of the layer, and so part of the radiation in question emerges at the front side of the long-afterglow layer 10. This transmission through the long-afterglow layer 10 and the emission of the radiation source 2 are coordinated with one another such that the emission of electromagnetic radiation in the visible range by the emergency lighting element 1 or the luminance is at least 50% higher when the radiation source 2 is switched on compared with when the radiation source 2 is switched off, that is to say in particular 50% higher than the emission or the luminance of the fully charged long-afterglow layer 10.

At the same time, the long-afterglow layer 10 is designed in such a way that after complete charging and subsequent darkness for 10 minutes, it emits a luminance of at least 0.3 mcd/m². This, too, can be achieved through the choice of the number of pigments and the arrangement thereof in the matrix, besides suitable choice of material.

It is possible for a person skilled in the art, with reasonable effort, to find a composition for the long-afterglow layer 10 which satisfies all of the above requirements.

Furthermore, a protective layer 20 is provided on the front side of the long-afterglow layer 10, and protects the underlying elements 10, 2 against external influences. The protective layer 20 is of substantially transparent configuration, wherein regions 21 of the protective layer 20 are colored to form the word "EXIT", such that the word is highly readable both in the event of external illumination of the emergency lighting element 1 and when the radiation source 2 is switched on or the long-afterglow layer 10 is persistently glowing.

Figure 2:
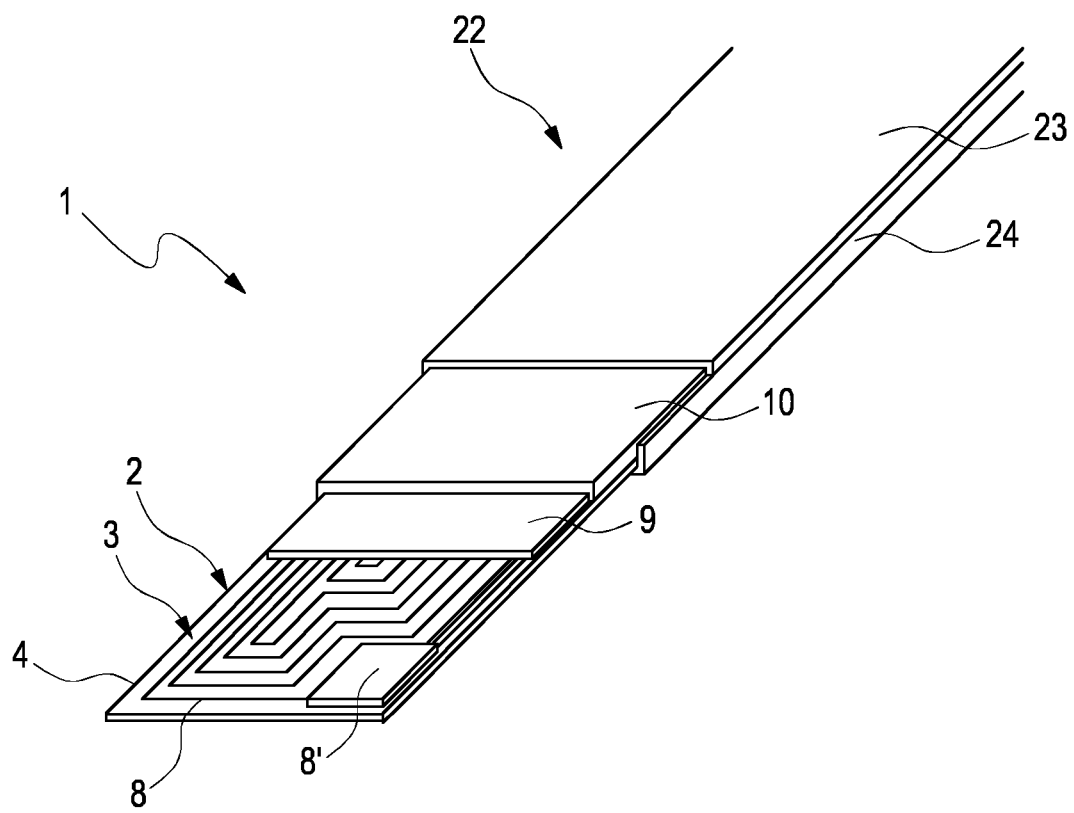
FIG. 2 shows a second exemplary embodiment of an emergency lighting element according to the present disclosure.

FIG. 2 illustrates a second exemplary embodiment of an emergency lighting element 1 according to the present disclosure. In this case, the emergency lighting element 1 is designed as an elongated or strip-shaped escape route marking for laying on the floor of the aircraft cabin of a commercial aircraft. The illustration in FIG. 2 is restricted to one end of the emergency lighting element 1, in which case—in a manner comparable to FIG. 1—individual elements or layers are not fully shown in the illustration in order to allow a view of the underlying elements or layers. In principle, however, the individual layers each extend over the whole area of the respective underlying layers.

The emergency lighting element 1 comprises carrier material 4 as part of a radiation source 2, onto which material a coupling coil 8 is printed and connected to a control circuit 8'. In this case, the coupling coil 8 serves to receive not only wirelessly transmitted energy but also wirelessly transmitted control signals for activating and deactivating the radiation source 2 by means of the control circuit 8'. The control circuit 8', too, is printed onto the carrier material 4. An electroluminescent film 9 is provided as the element of the radiation source 2 that generates the electromagnetic radiation, the electroluminescent film being arranged on the carrier material 4 in planar fashion, resulting in a total thickness of the radiation source 2 of only 0.5 mm. The electroluminescent film 9 is reflective for visible light.

A long-afterglow layer 10 identical to that from FIG. 1 is provided on the front side of the radiation source 2. The layer 10 thus has a thickness of 1.2 mm and comprises long-afterglow pigments on the basis of zinc sulfide that are embedded in a transparent matrix composed of polycarbonate. Since the electroluminescent film 9 of the second exemplary embodiment in accordance with FIG. 3 has an emission spectrum 2' comparable to the light emitting diodes 5 used as radiation source 2 in the first exemplary embodiment in accordance with FIG. 1, the relationships of the emission and absorption spectra in accordance with FIG. 3 are again found in the second exemplary embodiment as well. Through suitable choice of the number of pigments and the arrangement thereof in the matrix, the long-afterglow layer 10 is designed such that the penetration depth into the long-afterglow layer 10 for the radiation emanating from the radiation source 2 is only a little greater than the thickness of the layer, and so only little of the radiation emanating from the radiation source 2 emerges at the front side of the long-afterglow layer 10. The transmission for the radiation in question through the long-afterglow layer 10 can be 8%, for example.

In order to be able to withstand the loadings as an escape route marking laid on the floor, the emergency lighting element 1 has a housing 22 enclosing the radiation source 2 and the persistently glowing layer 10, the housing not only affording protection against mechanical loading but also keeping moisture away. The housing 22 consists of two parts 23, 24 connected to one another in a moisture-tight manner, wherein the housing part 23 spanning the front side of the persistently glowing layer 10 is embodied in transparent fashion. In this case, the housing part 23 can also be colored.

Figure 4:
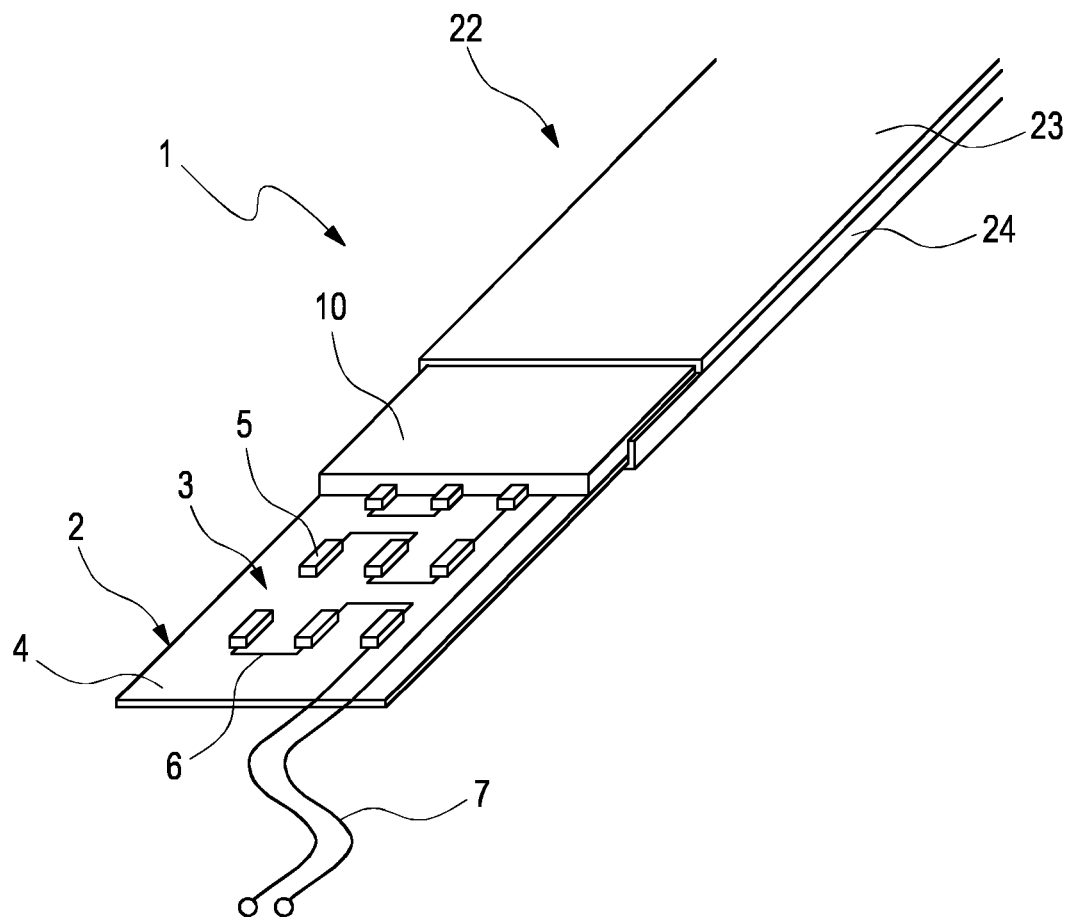
FIG. 4 shows a third exemplary embodiment of an emergency lighting element according to the present disclosure.

FIG. 4 illustrates a third exemplary embodiment of an emergency lighting element 1 according to the present disclosure. In this case—in a manner comparable to the second exemplary embodiment in accordance with FIG. 2—the emergency lighting element 1 is designed as an elongated or strip-shaped escape route marking for laying on the floor of the aircraft cabin of a commercial aircraft. The illustration in FIG. 4 is again restricted to one end of the emergency lighting element 1, in which case individual elements or layers are not fully shown in the illustration in order to allow a view of the underlying elements or layers. In principle, however, the individual layers each extend over the whole area of the respective underlying layers.

The emergency lighting element 1 comprises a planar radiation source 2 comprising a carrier material 4, which is configured to reflect visible light on the front side 3 of the radiation source 2 and on which a multiplicity of light-emitting diodes 5 in a planar arrangement and also conductor tracks 6 for supplying the diodes with energy are printed, such that the radiation source 2 emits electromagnetic radiation—in this case UV-C radiation—in a planar fashion at its front side. The conductor tracks 6 are led as far as the edge of the carrier material 4 and are connected to a cable link 7 for supplying the radiation source 2 with electrical energy. The thickness of the radiation source 2 is 0.75 mm in this exemplary embodiment.

A long-afterglow layer 10 having a thickness of 0.7 mm is provided on the front side of the radiation source 2, in which layer long-afterglow pigments based on strontium aluminate are dispersed in a matrix composed of silicone. Here, too, the long-afterglow layer 10 is designed such that the penetration depth for the radiation emanating from the radiation source 2 is greater than the thickness of the long-afterglow layer 10, and at the same time a luminance of 0.1 mcd/m² is attained after complete charging of the long-afterglow layer 10 and subsequent darkness for 10 minutes.

Figure 5:
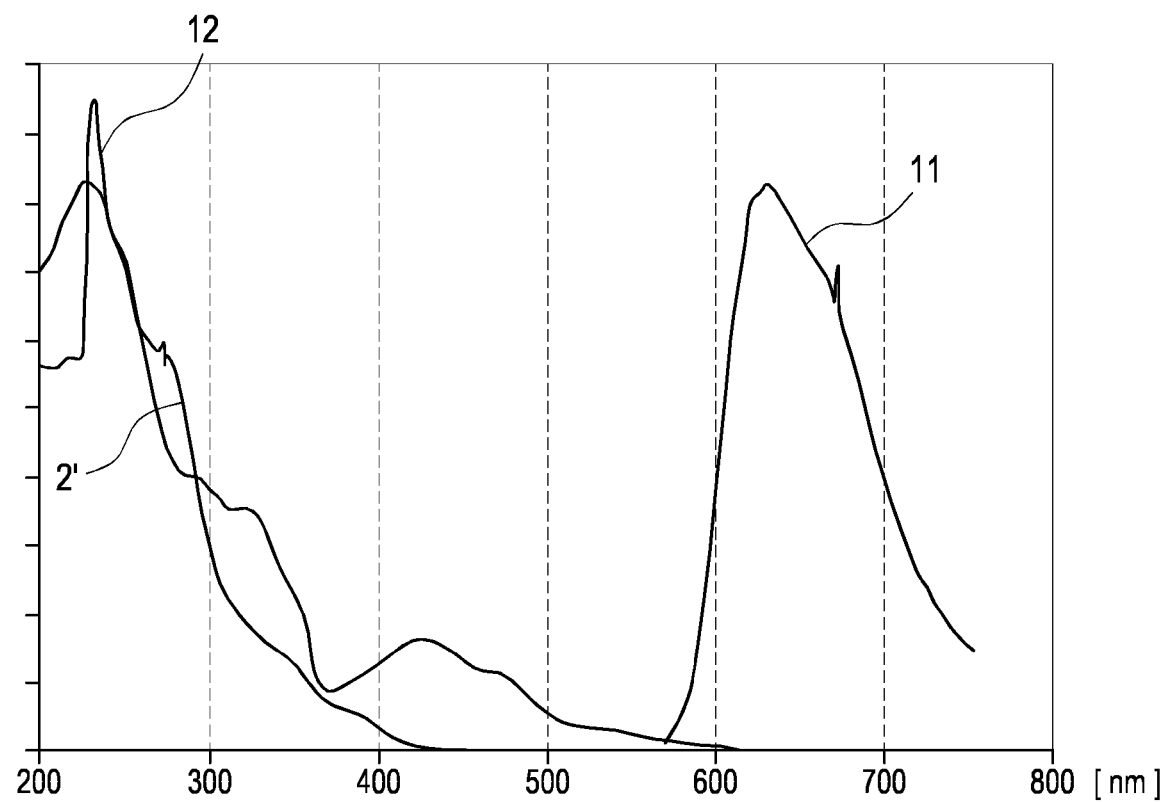
FIG. 5 shows a schematic illustration of the emission and absorption spectra of radiation source and long-afterglow layer from FIG. 4.

As is evident from the emission and absorption spectra of the radiation source 2 and the long-afterglow layer 10 in accordance with FIG. 5, the radiation source 2 emits radiation in the UV-C range at its front side (emission spectrum 2'), which radiation falls completely into the absorption spectrum 12 of the long-afterglow layer 10, which in turn emits light in the visible range (emission spectrum 11). In the case of the emergency lighting element 1 in accordance with FIG. 4, the ultimate light emission is thus produced exclusively by the long-afterglow layer 10, which however is or remains permanently charged by the radiation source 2 in the switched-on state.

In order to be able to withstand the loadings as an escape route marking laid on the floor, the emergency lighting element 1 has a housing 22 enclosing the radiation source 2 and the persistently glowing layer 10, the housing not only affording protection against mechanical loading but also keeping moisture away. The housing 22 consists of two parts 23, 24 connected to one another in a moisture-tight manner, wherein the housing part 23 spanning the front side of the persistently glowing layer 10 is embodied in transparent fashion. In order to prevent the UV-C radiation of the radiation source 2 from emerging toward the outside, the housing part 23 is additionally designed as a UV filter for filtering out UV-C radiation. The light in the visible range emanating from the persistently glowing layer 10 can however pass through the housing part 23 unfiltered.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An emergency lighting element, comprising:
   a planar, electrically operable radiation source for planar emission of electromagnetic radiation at a front side of the radiation source, wherein the radiation source is configured to emit electromagnetic radiation in the UV range;
   a long-afterglow layer over a whole area on the front side of the radiation source; and
   a UV filter tuned to the radiation of the radiation source is disposed on a side of the long-afterglow layer facing away from the radiation source,
   wherein a penetration depth into the long-afterglow layer for radiation emitted by the radiation source corresponds at least to a thickness of the long-afterglow layer,
   wherein the long-afterglow layer comprises phosphorescent material, an absorption spectrum of the long-afterglow layer at least partly overlaps an emission spectrum of the radiation source and an emission spectrum of the long-afterglow layer lies substantially in a visible range, and
   wherein emission of visible light by the emergency lighting element is effected solely by the long-afterglow layer.

2. The emergency lighting element as claimed in claim 1, wherein:
   the long-afterglow layer comprises a transparent or translucent matrix, with phosphorescent pigments embedded therein.

3. The emergency lighting element as claimed in claim 2, wherein:
   the transparent or translucent matrix comprises a polymer, acrylate, epoxy, silicone or glass, and the phosphorescent pigments comprise zinc sulfide or strontium aluminate.

4. The emergency lighting element as claimed in claim 1, wherein:
   the long-afterglow layer is designed in such a way that, after complete charging and subsequent darkness for 10 minutes, the long-afterglow layer emits a luminance of at least 0.03 mcd/m$^2$.

5. The emergency lighting element as claimed in claim 1, wherein:
   the radiation source is designed for emitting electromagnetic radiation in the visible range and the long-afterglow layer is designed for partly transmitting the radiation, and
   the emission of the radiation source and the transmission of the long-afterglow layer are coordinated with one another such that the emission of electromagnetic radiation in the visible range by the emergency lighting element is at least 50% higher when the radiation source is switched on compared with when the radiation source is switched off.

6. The emergency lighting element as claimed in claim 1, wherein:
   the radiation source is designed as a reflection layer for radiation impinging thereon at least in the visible range.

7. The emergency lighting element as claimed in claim 1, wherein:
   the planar radiation source is designed as a planar arrangement of a multiplicity of light-emitting diodes.

8. The emergency lighting element as claimed in claim 1, wherein:
   the planar radiation source is an electroluminescent film.

9. The emergency lighting element as claimed in claim 1, wherein:
   the thickness of the planar radiation source is less than 2.5 mm.

10. The emergency lighting element as claimed in claim 1, wherein:
    the thickness of the long-afterglow layer is at least 0.4 mm.

11. The emergency lighting element as claimed in claim 1, further comprising:
    for supplying the radiation source with electrical energy, a cable link or a coupling coil for wireless energy transmission.

12. The emergency lighting element as claimed in claim 1, further comprising:
    a control circuit configured to change a switch-on state of the radiation source, wherein the control circuit is printed onto a carrier material of the planar radiation source.

13. The emergency lighting element as claimed in claim 1, further comprising,
    for protection against external influences on a side of the long-afterglow layer facing away from the radiation source, a transparent or translucent protective layer or radiation source and long-afterglow layer arranged in a housing, which is transparent or translucent at least in a region of the long-afterglow layer.

14. The emergency lighting element as claimed in claim 1, wherein:
    the emergency lighting element is designed as an escape route marking.

15. The emergency lighting element as claimed in claim 1, wherein:
the radiation source is configured to emit electromagnetic radiation exclusively in the UV range.

* * * * *